G. L. LYON.
CRANK BOX OF GASOLENE ENGINES.
APPLICATION FILED AUG. 26, 1908.
911,891.
Patented Feb. 9, 1909.
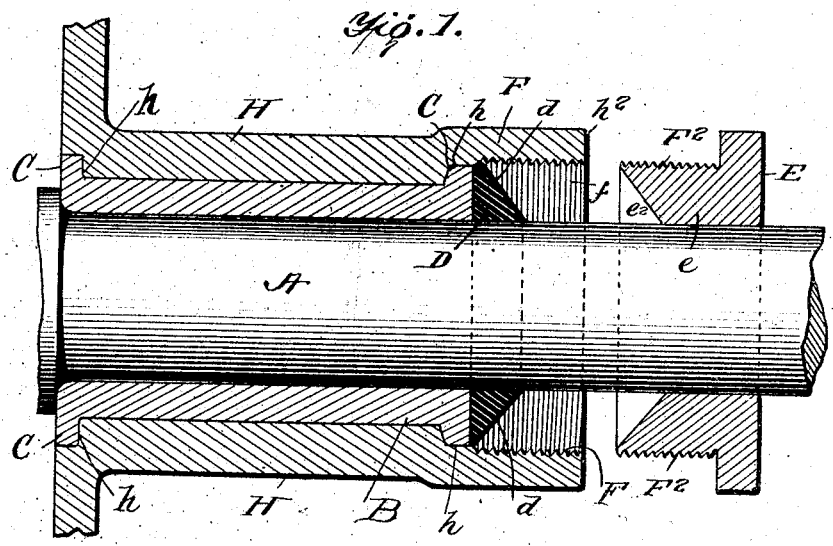
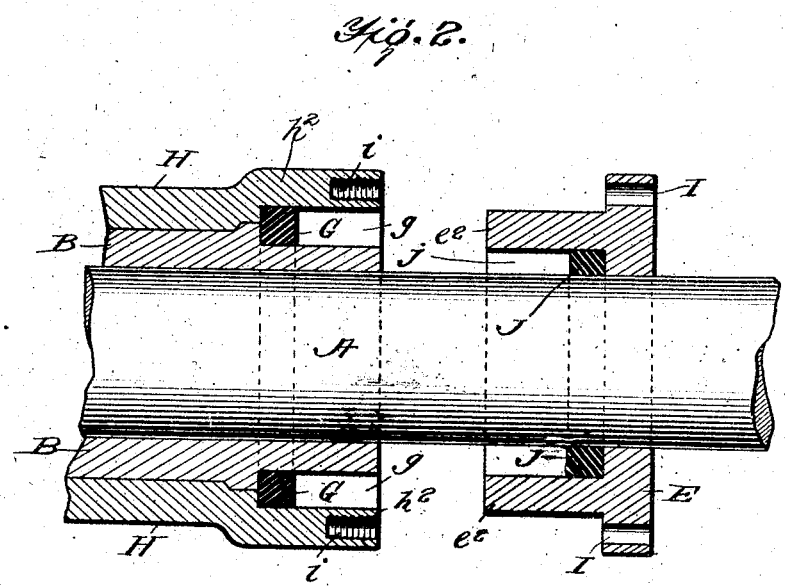
WITNESSES
f. H. Schmidt
H. J. May
INVENTOR
George L. Lyon,
BY
ATTORNEY

UNITED STATES PATENT OFFICE.

GEORGE L. LYON, OF NAHANT, MASSACHUSETTS.

CRANK-BOX OF GASOLENE-ENGINES.

No. 911,801. Specification of Letters Patent. Patented Feb. 9, 1909.

Application filed August 26, 1908. Serial No. 450,330.

*To all whom it may concern:*

Be it known that I, GEORGE L. LYON, a citizen of the United States, residing at Nahant, in the county of Essex and Commonwealth of Massachusetts, have invented a new and useful Improvement in Crank-Boxes of Gasolene-Engines, of which the following is a specification.

My invention relates to improvements in crank boxes of gasolene engines which require a crank box compression, and the objects of my invention are first to improve the compression and to stop the leakage of gases from the crank chamber, second to improve the lubrication of the bearings.

It is well known that in all engines which use the crank chamber compression, the bearings become worn to the extent that the gases blow out of the case around the crank shaft, and also through the joint made by the crank shaft bearing and crank case. This not only affects the compression, but also the lubrication, blowing the latter out and cutting it with the gasolene mixture. The more the bearing is worn, the greater the leakage and loss of fuel. My device overcomes all crank case leakage around the shaft and bearing joints.

I attain the objects of my invention as shown in the accompanying drawings in which:—

Figure 1 shows a section of a crank case, shaft and bearings of a gasolene engine. Fig. 2 shows a section of a crank case with a double protection of the compression.

Referring in detail to the drawings, and first to Fig. 1 thereof: A represents a crank-shaft. B represents a cylindrical bronze or Babbitt bearing, in which said shaft turns, and which is provided, at each end, with an annular flange C. H represents a crank-casing, which is provided, toward each end, with an annular recess $h$, in which fits the flanges C. The upper portion of the cylindrical crank-casing is provided with a cylindrical extension $h^2$, which projects beyond the outer end of the cylindrical bearing B, and is internally screw-threaded, as shown at F. The region between the extension $h^2$ and the adjacent portion of the crank-shaft A therefore forms a socket or chamber $f$. In the bottom of this socket and disposed against the end of the annular flange C of the bearing B, and encircling the crank-shaft A, is a flexible packing D, preferably formed with a conical or tapering upper surface $d$, as shown. Encircling the upper portion of the crank-shaft A is a ring or cap E, carrying a depending, cylindrical follower $e$, also encircling said shaft A; which follower is exteriorly threaded, as shown at $F^2$ to engage the internal threads F of the extension $h^2$ of the casing H, and has, preferably, a dished-out bottom $e^2$ to register and engage with the conical or tapering upper surface $d$ of the packing D. When the ring E is adjusted with the follower $e$ engaging the extension $h^2$ and said follower fully screwed down, the socket or chamber $f$ will be closed and filled by said follower and the packing D compressed, the wedging action being enhanced by the tapering contour $d$ of the upper portion of the packing D and the correspondingly inclined bottom surface $e^2$ of the follower $e$.

Referring, now, to Fig. 2, showing a modification of my invention: the outer end of the extension $h^2$ of the casing H is provided with screw-sockets $i$, with which engage screws (not shown) extending through slots I in the rim of the cap or ring E, whereby the ring may be locked against the casing H. In this form of device, also, there is an arrangement of double packing; that is to say, in addition to the annular packing G in the socket or chamber $g$, there is provided an additional packing J disposed in the socket or chamber $j$ between the follower $e^2$ and the shaft A, which packing, when the ring E is brought against the outer end of the casing H, will impinge against the outer end of the bearing B, as is obvious.

Having thus fully described my invention, what I claim as new and desire to secure by Letters-Patent is:

The combination with a shaft, of a cylindrical bearing encircling the same, of a cylindrical casing encircling the bearing and provided with a cylindrical, internally-threaded extension projecting beyond the outer end of said bearing, said extension and the shaft forming therebetween a socket, a flexible packing encircling the shaft and disposed in said socket at the end of said bearing, and a ring encircling the shaft and carrying a depending, exteriorly-threaded follower adapted to engage the threaded extension and fill said socket and compress said packing.

In testimony whereof I have hereunto set my hand in the presence of two subscribing witnesses.

GEORGE L. LYON.

Witnesses:
CHARLES W. LOVETT,
GEORGE W. WYLIE.